Nov. 29, 1966    E. E. GRANKOWSKI    3,287,950
DIAPHRAGM TYPE HYDRAULIC PRESS
Filed Nov. 6, 1963

Inventor
Eugene E. Grankowski
By: Olson, Trexler, Wolters & Bushnell
attys

| United States Patent Office | 3,287,950
|---|---|
| | Patented Nov. 29, 1966 |

3,287,950
DIAPHRAGM TYPE HYDRAULIC PRESS
Eugene E. Grankowski, Chicago, Ill., assignor to Verson Allsteel Press Company, Chicago, Ill., a corporation of Illinois
Filed Nov. 6, 1963, Ser. No. 321,879
3 Claims. (Cl. 72—63)

The present invention relates to a novel workpiece forming apparatus, and more specifically to a novel diaphragm type hydraulic press.

Presses of the type contemplated herein generally include means for providing a chamber or cavity into which a workpiece to be formed may be placed, and a resilient diaphragm or bag which is adapted to be expanded by hydraulic fluid under pressure within the cavity for pressing against and forming the workpiece on a suitable die or form. As a result of high fluid pressures which are used, substantial problems are encountered when attempting to provide the chamber or cavity defining means and a diaphragm which are operable and economically feasible.

An important object of the present invention is to provide a novel apparatus of the above described type which is constructed so as to include a simplified and more economical cavity whereby the cost of constructing and maintaining the apparatus may be reduced.

A further important object of the present invention is to provide a novel apparatus of the above described type having a diaphragm structure which can be expanded and extended relatively great amounts without undue stress or injury thereto.

Figure 1:
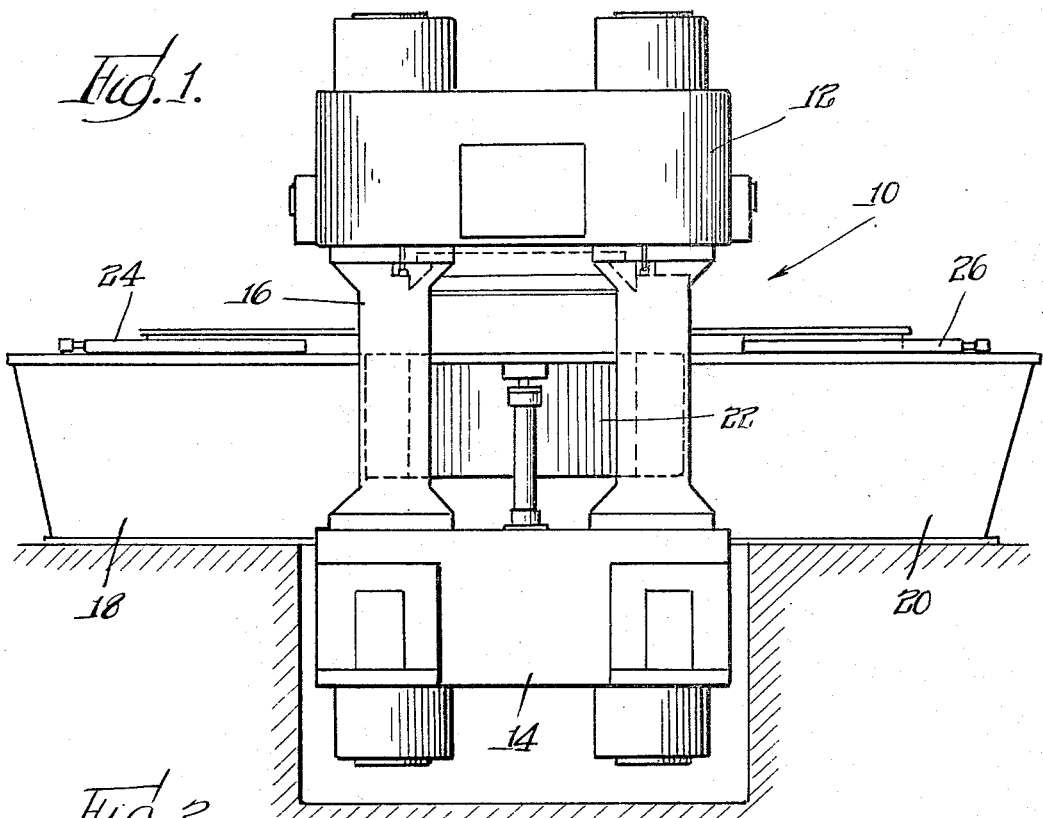
Figure 2:
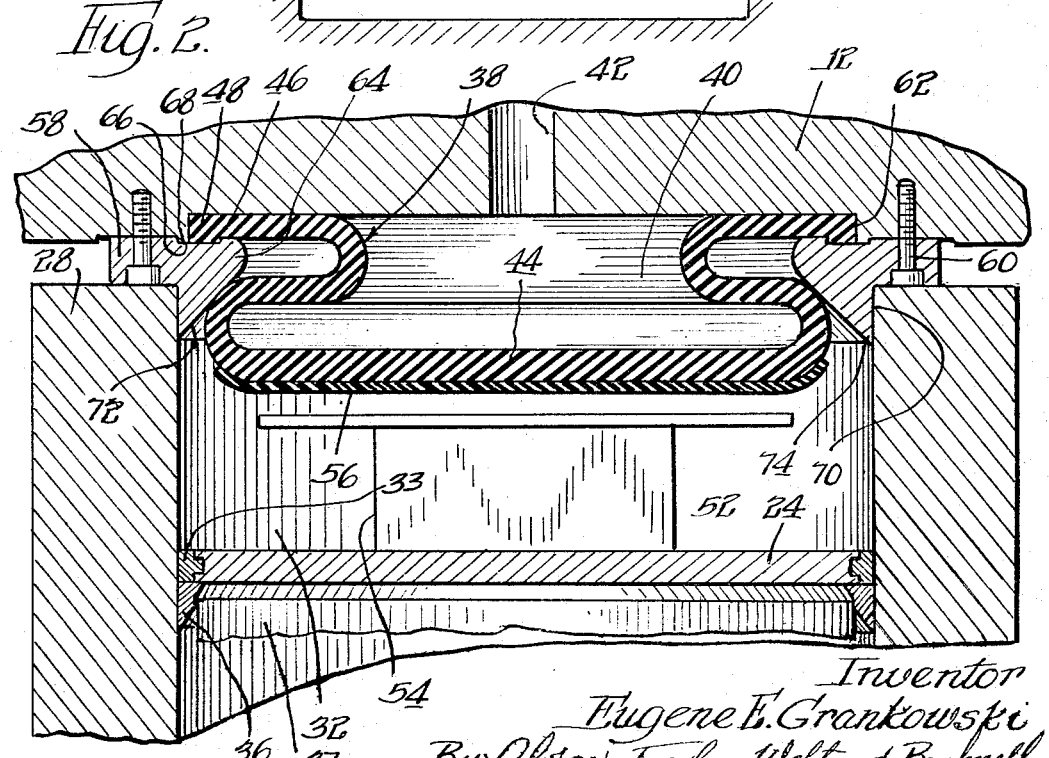

Other objects and advantages of the present invention will become apparent from the following description and the accompanying drawings wherein:

FIG. 1 is a side elevational view showing an apparatus incorporating features of the present invention; and FIG. 2 is an enlarged fragmentary sectional view showing features of the present invention in greater detail.

Referring now more specifically to the drawings wherein like parts are designated by the same numerals throughout the various figures, an apparatus 10 incorporating features of the present invention is shown in FIG. 1. In general, the apparatus comprises head and base portions 12 and 14 joined by heavy vertically extending connecting rods 16. The apparatus is provided with table portions 18 and 20 extending laterally in opposite directions from a centrally located work station 22. Work suporting members or pallets 24 and 26 are shiftably disposed on the table portions 18 and 20 for movement between laterally retracted and work loading positions and the central work station. The structure for advancing and retracting the work supporting pallets forms no part of the invention claimed herein and need not be shown or described in detail.

In accordance with a feature of the present invention the apparatus 10 is provided with simple and rugged means at the work station 22 for forming a cavity in which a workpiece is to be processed. This means comprises a heavy cylindrical member 28 which is vertically arranged between the head and base portions 12 and 14. The cylindrical member 28 is vertically shiftably supported by fluid operated piston and cylinder devices 30, only one of which is shown in FIG. 1. The arrangement is such that the cylinder 28 may be lowered sufficiently for enabling the pallets 24 and 26 selectively to be moved to and from the central work station 22 and their respective workpiece loading stations. In addition the cylinder 28 is adapted to be raised to a position shown best in FIG. 2 for cooperating with the head member 12 and defining a work chamber or cavity 32.

The pallets 24 and 26 are circular in shape and have a diameter similar to the inner diameter of the cylinder 28. When the cylinder is in the raised position shown in FIG. 2, it closely encircles the pallet located at the work station so that the pallet serves to define the bottom of the work chamber or cavity 32. A resilient sealing ring 33 is provided around each pallet so as to seal any clearance between the pallet and the cylinder when pressure is applied. An annular ring 36 is fixed on a pallet supporting member 37 for also sealing the chamber.

In accordance with another important feature of the present invention, the apparatus includes an expandable diaphragm 38 formed from a tough resilient rubber or rubber-like material. The diaphragm is secured against the head member 12 so as to provide a fluid-tight chamber 40 into which hydraulic fluid under pressure may be introduced through a passageway 42. As will be understood, the passageway 42 is adapted to be connected to a suitable source of fluid under pressure, not shown.

The diaphragm 38 is in the form of a corrugated cylinder having a diameter similar to but less than the internal diameter of the cylindrical member 28. The cylindrical diaphragm 38 has its lower end closed by an end wall 44. An upper end of the diaphragm terminates in a radially extending flange 46 preferably having a thickened peripheral edge 48. The diaphragm is formed with one or more corrugations 50 between the end wall 44 and the upper flange 46 for promoting expansion and axial extension of the diaphragm substantially throughout the cavity 32 when hydraulic fluid under pressure is forced into the chamber 40.

As shown in FIG. 2 a workpiece 52 to be processed is positioned on a form or die 54 which is placed on the pallet within the work chamber or cavity 32. When hydraulic fluid under pressure is delivered into the chamber 40, the diaphragm 38 is expanded and extended so as substantially completely to fill the cavity 32 and press against and form the workpiece 52 around the die 54. In order to protect the end wall 44 of the diaphragm against undue wear or abrasion, a replaceable pad or sheet 56 is adhesively secured to the end wall 44. The sheet 56 is thus disposed for direct contact with the workpiece 52.

In order to secure the upper end of the diaphragm to the head member 12 and also to seal the upper end portion of the work cavity 32, a ring 58 is fixed against the underside of the head member 12 by a plurality of screws 60 or other fastening devices. The head member 12 is formed with a circular recess 62 for receiving the upper end portion 36 of the diaphragm and the ring 58 includes an inwardly projecting portion 64 for underlying a marginal portion of the recess 62 and the marginal portion 48 of the diaphragm. The portion 64 of the ring member is provided with an annular recess 66 for accommodating the thickened marginal portion 48 of the diaphragm and a complementary depending annular rib 68 formed on the head member 12 whereby the diaphragm marginal portion 48, the head member 12 and the ring member 58 are securely interlocked with each other.

The ring member 58 has an annular notch 70 formed in its under and outer sides for slidably accommodating the upper margin of the cylinder 28 as shown in FIG. 2. As will be understood, when the diaphragm 38 is fully expanded under the force of hydraulic pressure, there will be a tendency to extrude the rubber material from the diaphragm through any crevice or crack in the surface of the work chamber 32 such as the slight crevice between the mating surfaces of the ring member 58 and the cylinder 28. However such undesirable extrusion of the diaphragm material is prevented by providing the ring member 58 with a bevelled inwardly facing surface 72 against which the expanded diaphragm is adapted to act for expanding the ring member 58. Such expansion of the ring member, and particularly the lower relatively thin and flexible margin 74 thereof, forces the ring member into tight engagement with the inner surface of the cylinder 28 whereby to prevent extrusion of the diaphragm material.

While the preferred embodiment of the present invention has been shown and described herein, it is obvious that many structural details may be changed without departing from the spirit and scope of the appended claims.

The invention is claimed as follows:

1. In an apparatus of the type described for forming a workpiece, fixed head means, an annular member movable axially toward and away from said head means for combining with said head means for providing a workpiece accommodating cavity, said annular member having an inner wall surface substantially parallel to its axis, a ring element secured to said head means and engageable within said inner wall surface, and resiliently expandable diaphragm means mounted on said head means within said ring means for traversing said annular means, said diaphragm means including a radially outwardly extending marginal flange portion clamped between said head means and said ring element, said ring element including an at least partially downwardly facing surface outwardly of an inner edge thereof, said diaphragm means including a sidewall portion extending from said marginal flange portion downwardly around said ring element inner edge and beneath said downwardly facing surface, said resiliently expandable diaphragm means being expandable by fluid under pressure for engaging and forming a workpiece positioned in said cavity and for engaging and radially expanding said ring element into tight sealing engagement with said inner wall surface and upwardly against said head means.

2. In an apparatus of the type described for forming a workpiece, fixed head means, an upstanding cylindrical member disposed beneath said head means and vertically movable toward and away from the head means for combining with the head means in defining a work accommodating cavity, a workpiece supporting pallet removably disposed and supported within said cylindrical member and defining a bottom of said cavity, a resiliently expandable diaphragm fixed with respect to said head means and adapted to be expanded by fluid under pressure within said cavity for engaging and forming a workpiece positioned within the cavity, said diaphragm including a lower end wall extending transversely of said cavity and a generally axially extended corrugated sidewall for facilitating expansion of the diaphragm, said diaphragm including an upper generally radially outwardly extending flange portion abutting said head means, and a ring member secured to said head means and underlying and securing a peripheral margin of said diaphragm flange portion with respect to the head means and exposing the remainder of said flange portion for enabling said remainder of the flange portion to be flexed downwardly within said ring member when the diaphragm is expanded, said ring member comprising an annular portion depending from said head means for entry within an upper end of said cylindrical member, said depending portion having a downwardly and outwardly bevelled surface engageable by said diaphragm when the diaphragm is expanded for radially expanding said depending portion into sealing engagement with said cylindrical member.

3. In an apparatus of the type described for forming a workpiece, first means defining a first end of a workpiece accommodating cavity, second means axially aligned with and spaced from said first means and defining an opposite end of the cavity, annular means axially aligned with and telescopically encircling at least portions of said first and second means and defining a side of the cavity, means mounting said annular means for movement axially of and relative to said first and second means for opening and closing the side of the cavity, and a resiliently expandable diaphragm secured to said first means and being expandable by fluid under pressure for engaging and forming a workpiece position in the cavity.

References Cited by the Examiner

UNITED STATES PATENTS

| 2,761,405 | 9/1956 | Moller | 72—63 |
| 2,882,566 | 4/1959 | Redhead | 264—315 |
| 3,033,143 | 5/1962 | Grankowski | 72—63 |
| 3,120,205 | 2/1964 | Pfeiffer et al. | 72—63 |

FOREIGN PATENTS 623,420   7/1961   Canada.

CHARLES W. LANHAM, *Primary Examiner.*